(12) United States Patent
Coventry et al.

(10) Patent No.: US 12,062,037 B1
(45) Date of Patent: Aug. 13, 2024

(54) SYSTEMS, METHODS, AND STORAGE MEDIA FOR CREATING AND IMPLEMENTING A SECURE STATE MACHINE IN A NETWORKED COMPUTING ENVIRONMENT

(71) Applicant: SmartContract Chainlink Limited SEZC, Grand Cayman (KY)

(72) Inventors: Alex Coventry, Grand Cayman (KY); Steve Ellis, Grand Cayman (KY); Ari Juels, Grand Cayman (KY); Sergey Nazarov, Grand Cayman (KY); Lorenz Breidenbach, Grand Cayman (KY)

(73) Assignee: SmartContract Chainlink Limited SEZC, Grand Cayman (KY)

( * ) Notice: Subject to any disclaimer, the term of this patent is extended or adjusted under 35 U.S.C. 154(b) by 299 days.

(21) Appl. No.: 16/919,666

(22) Filed: Jul. 2, 2020

Related U.S. Application Data

(60) Provisional application No. 62/870,113, filed on Jul. 3, 2019.

(51) Int. Cl.
| | |
|---|---|
| *G06Q 20/36* | (2012.01) |
| *H04L 9/06* | (2006.01) |
| *H04L 9/08* | (2006.01) |
| *H04L 9/00* | (2022.01) |

(52) U.S. Cl.
CPC ........... *G06Q 20/36* (2013.01); *H04L 9/0637* (2013.01); *H04L 9/0825* (2013.01); *G06Q 2220/00* (2013.01); *H04L 9/50* (2022.05)

(58) Field of Classification Search
CPC ....... H04L 9/0637; H04L 9/0825; H04L 9/50; G06Q 2220/00; G06Q 20/36
USPC .......................................................... 705/65
See application file for complete search history.

(56) References Cited

U.S. PATENT DOCUMENTS

| | | | |
|---|---|---|---|
| 10,872,381 B1 * | 12/2020 | Leise et al. ............ | G06Q 20/02 |
| 2018/0285979 A1 * | 10/2018 | Chessell et al. ....... | G06Q 40/08 |
| 2020/0104958 A1 * | 4/2020 | Cheng-Shorland et al. ................ | |
| | | | G06Q 10/101 |
| 2020/0160455 A1 * | 5/2020 | Singh et al. .......... | H04L 9/3239 |
| 2021/0006478 A1 * | 10/2021 | Levitt ..................... | H04L 63/10 |

* cited by examiner

*Primary Examiner* — Neha Patel
*Assistant Examiner* — Yin Y Choi
(74) *Attorney, Agent, or Firm* — Rimon PC; Marc S. Kaufman

(57) ABSTRACT

Systems, methods, and storage media for implementing a secure state machine implemented as computer logic in a networked computing environment are disclosed. Exemplary implementations may: generate a public key/private key pair for each of multiple participants respectively; provide a switch parameter for the state machine; specify time parameters for reporting, by an offchain oracle, the value of the switch parameter; and specify terms for reporting, by the offchain oracle, the value of the switch parameter to executable logic recorded on the distributed ledger. The executable logic making payment to pseudonymous wallet addresses associated with the keys in response to a value of the switch parameter received from the off-chain oracle.

21 Claims, 8 Drawing Sheets

SYSTEMS, METHODS, AND STORAGE MEDIA FOR CREATING AND IMPLEMENTING A SECURE STATE MACHINE IN A NETWORKED COMPUTING ENVIRONMENT

CROSS-REFERENCE TO RELATED APPLICATIONS

The present application claims benefit from U.S. Provisional Application Ser. No. 62/870,113 filed on Jul. 3, 2019, the contents of which are incorporated herein by reference in their entirety.

FIELD OF THE DISCLOSURE

The present disclosure relates to systems, methods, and storage media for implementing a secure state machine implemented as computer logic in a distributed networked computing environment.

BACKGROUND

Computer/data security has become an issue of primary importance. Virtually all aspects of life are documented on, and accomplished by, computing environments. Therefore, a tremendous amount of confidential data is processed and exchanged by computing devices. Current solutions for securing data include whitebox cloaking, encryption, and secure hardware. All these solutions are complex, require additional computing overhead, and can adversely affect the user experience.

Recently, it has been proposed that many computing tasks be accomplished in a "decentralized" computing environment, such as a distributed ledger. Decentralized environments generally do not require a centralized trusted party(s) and use some sort of consensus mechanism between participant nodes, to ensure accuracy of records. However, without a trusted central authority, data security becomes an even more complex problem. Distributed ledgers, such as Blockchain, the distributed ledger used for the most prevalent cryptocurrency Bitcoin, run on participant nodes (computing devices executing node software). Each participant node can include a full or partial copy of the ledger. The recordation of messages on the ledger can be governed by various verification and consensus mechanisms which are well known. The ledger is thus essentially a database of messages that is agreed upon by all participants. The messages are recorded in correspondence to "wallets". A cryptocurrency wallet is a device, physical medium, program or a service corresponding to an address which stores the public and/or private keys of a participant and can be used to track ownership, receive or spend cryptocurrencies. The address can be derived from a private cryptographic key of the associated participant. The messages can represent, for example, financial transactions, an object, or status thereof. In the case of Bitcoin, the messages on the ledger represent transactions of the cryptocurrency and thus ownership of each token of the cryptocurrency can be ascertained at any time through reference to the ledger.

The decentralization of many applications, such as financial markets, identity management and supply chain management, is well underway. For example, blockchain-based venture capital/crowd sales (known as "Initial Coin Offerings" (ICO)s, or "token offerings") have been widely adopted. As another example, IBM TradeLens™ is a supply chain management platform based on a distributed ledger. Supply chain management platforms track and record the status, movement, ownership, and control of physical goods, and related transactions, from one party to another. For example, as goods are ordered, manufactured, transported, and distributed to end users, the goods can move physically, take on different states, be owned by various parties, and be controlled by various parties. Data indicating these variables can be recorded on a distributed ledger to be selectively exposed to stakeholders as necessary for the specific supply chain.

Executable logic recorded on a distributed ledger (known as "smart contracts") are used for accomplishing various logical operations in a distributed ledger environment. Accordingly, there is potentially vast untapped value waiting to migrate "on chain", i.e. to take advantage of decentralized computing environments. However, implementing these more complex applications, such as sophisticated classes of financial instruments, on chain requires solutions to significant technical problems that are inherent to distributed ledger environments. The term "on-chain" as used herein, refers to data that is recorded, in whole or in part, on a distributed ledger. Similarly, "off-chain" refers to data that is transmitted and/or stored external to the distributed ledger environment of concern. Off-chain data could be stored in a conventional database or on a separate and distinct distributed ledger. In the case of a separate distributed ledger, the data can be considered "off-chain" with respect to the distributed ledger of interest.

Smart contract execution often relies on secure and accurate "oracles." The term "oracles" as used herein, refers to off-chain data sources that provide information, desirably in and accurate and timely manner, to smart contracts executing on a distributed ledger. Oracles can enable off-chain connectivity for the smart contract by reformatting external connection points (APIs) so that two different software applications are compatible for data exchange. The oracles can then pull data into the smart contract and/or push data out based on predefined instructions and endpoints outlined in a Service Level Agreement (SLA). For example, complex financial instruments require market conditions. Something as simple as exercising a stock option, for example, requires knowledge of the current market price of the target equity. As another example, in a supply chain management scenario, data such as weather, flight schedules, financial information relating to participants, locations of goods and services may be supplied oracles. In many cases, such data could be sensitive and confidential. For example, a technology company may not want others to know the nature of goods ordered to assemble a new product that is under development. Similarly, a military may not want the location of top secret goods to be disclosed. The availability of secure oracles is addressed in U.S. patent application Ser. No. 16/553,292, the entire disclosure of which is incorporated herein by reference.

However, the use of smart contracts raises technical issues of security. Smart contracts implementing workflows, financial instruments, and the like on distributed ledgers can leak critical and confidential information including monetary amounts, participant identities, locations and identities of goods, and business agreement. In today's complex markets, privacy is both a given and a legal requirement of most contracts. The reasons for privacy are varied but can include protecting against industrial espionage, adversarial trading or undesirable market events. Meaningful confidentiality in on-chain messages must extend to workflows, transactions, oracle queries, and oracle reports.

It is known to use "mixers" or "tumblers" to conceal the movement of cryptocurrency from one party to the other. However, such mechanisms do not conceal oracle reports and thus information from oracles can be exploited by hackers and "parasitic contracts", i.e. contracts that reuse freshly delivered oracle data. Parasitic contracts can give rise to complex systemic risks. Conventional security mechanisms, such as cryptography require complexity and computing overhead to be effective. For example, generalized ZKproofs (an open-industry protocol of zero-knowledge proof (ZKP) cryptography) require considerable implementation complexity, often relying on customized (virtual) circuitry and state-of-the-art optimizations that few have the expertise to review. Further Trusted Execution Environments (TEE) are known to deliver strong confidentiality and high performance. However, TEEs can introduce trust assumptions some users prefer to avoid given recently demonstrated vulnerabilities.

The Discreet Log scheme described in Dryja, T. Discreet log contracts, https://adiabat.github.io/dlc.pdf, 2017, is a pioneering work in oracle-based DeFi. The objective of that scheme is to support an oracle-based DeFi contract in Bitcoin that is indistinguishable from an ordinary Lightning Network transaction. In other words, the participation of an oracle in contract transactions is meant to be unobservable, as is the very fact that participants are engaging in a contract. The Discreet Log scheme, however: 1) assumes an oracle that publicly broadcasts data off-chain or in the Bitcoin P2P network; 2) assumes that all transactions use Schnorr signatures (which Bitcoin does not yet support); 3) doesn't conceal payments to participants; 4) makes oracle participation not visible; 5) has strict requirements on users staying online; and 6) requires settlement of the contract after each oracle report unless using off-chain Lightning channels.

Many computing applications, including smart contracts, are coded as one or more "state machines", i.e., modules that read one or more inputs and switch to a state for a given input. State machines can be implemented by very simple programmed structures and are conceptually easy for developers. When embodied as smart contracts executing on a public distributed ledger, the logic and status of a state machine are transparent. However, known security measures add complexity, as described above, and thus can obviate many of the advantages of the use of state machines in computer implemented functions, especially when the state machine is executing on a public distributed ledger or other decentralized computing platform. Therefore, it would be desirable to implement more secure state machines that do not require the complexity of known security mechanism.

SUMMARY

As noted above, smart contracts produce state changes on-chain, which can expose a correlation between the input and output of a smart contract. Implementations disclosed herein provide an architecture that redefines state machines, such as those implemented by smart contracts, through bifurcation; where the state change is separated from the output message to thereby maintain security. These two components are divided into off-chain and on-chain components and are not coupled in way that permits correlation. The interlinking components that connect the state change and the output message, while maintaining security, are the oracle(s). The off-chain component can be a specification that represents a service level agreement, including terms and logic, outlining payment to the oracles for retrieving specific data and using it to compute the correct state change. The on-chain component can be a smart contract that specifies, for example, a message to be recorded on the distributed ledger in correspondence to the participants based on an input from at least one oracle.

The smart contract can generate a query to request an oracle or set of oracles to obtain some piece of data (for example market data) that will be used to determine the outcome of the state machine. The details of the query can be agreed to in the off-chain specification and therefore not publicly viewable to on-chain observers. Instead of returning a raw piece of data, such as the actual price of the asset, the oracle(s) returns a report (oracle report) that can be the basis of a true (1) or false (0) determination of the data. The oracle report determines the state change, of the on-chain smart contract containing terms that outline actions, such as how payments are to be distributed to participants, based on the oracle report. In the case of a payout, the timing of payments can be further obfuscated by conducting many rounds of. With this technique, it becomes even more difficult to know how much a particular contract is worth and the amount of the payout.

As described in detail below, the implementations disclosed herein offer higher levels of security in the use of oracles. Users can use a simple mixer, employ numerous anonymous addresses, make partial payments, and obfuscate the timing through multiple rounds. Significantly, the number of payouts can be the same for all outcomes of the state machine, making it hard for an outside observer to differentiate.

The implementations also give participants the option to make the oracle report auditable by third party stakeholders, which can be compared with the state machine provided by the audited entities participating in the smart contract. For example, applications must work within the current legal framework for enterprises that operate in highly regulated environments. Further, in the field of supply chain management, it is important to be able to confirm that assets and related aspects of the supply chain were handled properly. By separating state changes from outcomes of the state machine and using oracles to pass data confidentially between them, applications on public blockchains become far more secure and attractive to highly regulated enterprises with large capital allocations.

One aspect of the present disclosure relates to a system configured for implementing a secure state machine implemented as computer logic in a networked computing environment. The system may include one or more hardware processors configured by machine-readable instructions. The processor(s) may be configured to generate a public key/private key pair for each of multiple participants respectively. Each public key/private key pair may be associated with a pseudonymous wallet address in a distributed ledger environment defined by multiple nodes. Each node may include computer hardware and node software. The processor(s) may be configured to provide a switch parameter for the state machine. The switch parameter may assume one of plural values. The processor(s) may be configured to specify time parameters for reporting, by an offchain oracle, the value of the switch parameter. The processor(s) may be configured to specify terms for reporting, by the offchain oracle, the value of the switch parameter to executable logic recorded on the distributed ledger. The terms may include identification of a time limit on reporting the switch logic and an address of executable logic stored on the distributed ledger. Whereby the executable logic may record a message on the distributed ledger corresponding to at least one of the wallet addresses based on the switch value as reported by the offchain oracle in accordance with the time parameters and the terms.

Another aspect of the present disclosure relates to a method for implementing a secure state machine implemented as computer logic in a networked computing environment. The method may include generating a public key/private key pair for each of multiple participants respectively. Each public key/private key pair may be associated with a pseudonymous wallet address in a distributed ledger environment defined by multiple nodes. Each node may include computer hardware and node software. The method may include providing a switch parameter for the state machine. The switch parameter may assume one of plural values. The method may include specifying time parameters for reporting, by an offchain oracle, the value of the switch parameter. The method may include specifying terms for reporting, by the offchain oracle, the value of the switch parameter to executable logic recorded on the distributed ledger. The terms may include identification of a time limit on reporting the switch logic and an address of executable logic stored on the distributed ledger. Whereby the executable logic may record a message on the distributed ledger corresponding to at least one of the wallet addresses based on the switch value as reported by the offchain oracle in accordance with the time parameters and the terms.

Yet another aspect of the present disclosure relates to a non-transient computer-readable storage medium having instructions embodied thereon, the instructions being executable by one or more processors to perform a method for implementing a secure state machine implemented as computer logic in a networked computing environment. The method may include generating a public key/private key pair for each of multiple participants respectively. Each public key/private key pair may be associated with a pseudonymous wallet address in a distributed ledger environment defined by multiple nodes. Each node may include computer hardware and node software. The method may include providing a switch parameter for the state machine. The switch parameter may assume one of plural values. The method may include specifying time parameters for reporting, by an offchain oracle, the value of the switch parameter. The method may include specifying terms for reporting, by the offchain oracle, the value of the switch parameter to executable logic recorded on the distributed ledger. The terms may include identification of a time limit on reporting the switch logic and an address of executable logic stored on the distributed ledger. Whereby the executable logic may record a message on the distributed ledger corresponding to at least one of the wallet addresses based on the switch value as reported by the offchain oracle in accordance with the time parameters and the terms.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

To describe the disclosed implementations, an apparatus and process will be described at a high level followed by more specific illustrative examples.

Figure 1:
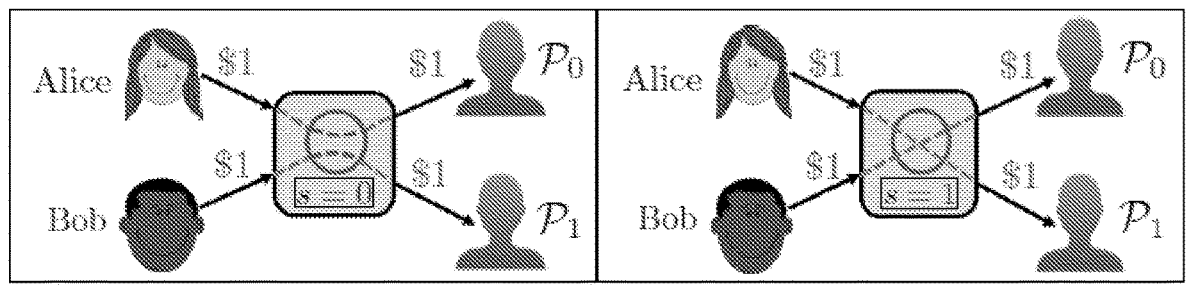
FIG. 1 illustrates the operation of a simple mixer.

FIG. 1 illustrates the operation of a simple mixer with two inputs and two outputs. In this example, Alice and Bob use the mixer to pay two pseudonymous users called $\mathcal{P}_0$ and $\mathcal{P}_1$. Any observer can see the payments into and out of the mixer because, in the example the mixer is implemented on a public distributed ledger. The confidentiality provided by the mixer, however, means that an observer can't tell whether Alice has designated $\mathcal{P}_0$ as a payee and Bob has designated $\mathcal{P}_1$ as payee, or vice versa. Inputs are pooled, and outputs just draw on the pool. One can think of the mixer as a payment switch with a private bit s: s=0 means Alice pays $\mathcal{P}_0$ and s=1 means Alice pays $\mathcal{P}_1$ and vice versa for Bob.

Disclosed implementations are inspired by mixers but do not aim at mixer-like concealment of funds. Instead, implementations trigger mixers with oracle inputs, rather than at random. Implementations disclosed herein extend the concept of mixers to a more general notion of decorrelating input messages and output messages. In this generalized view, a mixer can implement a message state machine whose internal operation is private. In disclosed implementations, the state machine accepts an input report from an oracle.

Figure 2:
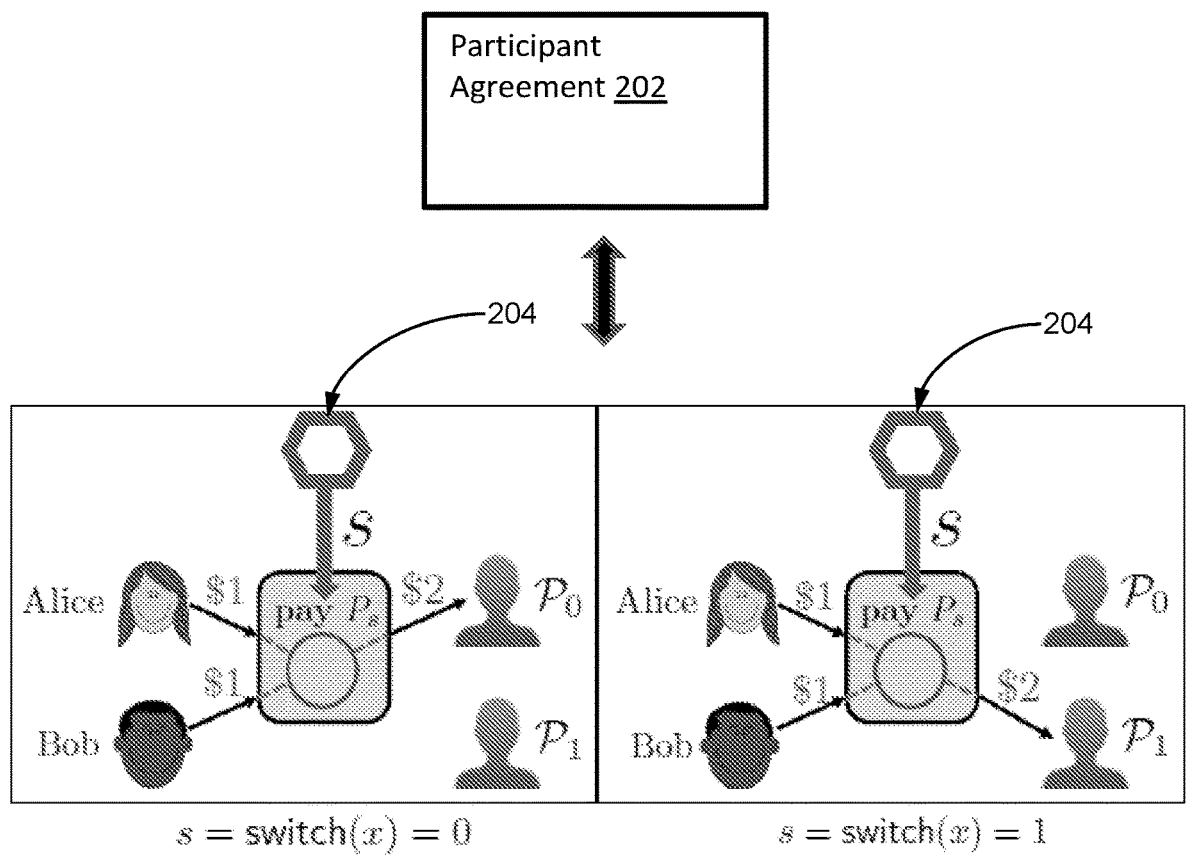
FIG. 2 illustrates the logic of a state machine embodying some basic concepts of the disclosed implementations.

As an example, a state machine can receive monetary payments and pay all of the money it receives to just one participant based on the outcome x of some event, as shown in FIG. 2. If $\mathcal{P}_0$ and $\mathcal{P}_1$ are pseudonyms for Alice and Bob, i.e., Alice and Bob are paying themselves, then this state machine is a binary bet. Let X denote the space of possible event outcomes, i.e., x EX. Then x might be the result of an election, e.g., x='Democrats" or "Republicans." In this case, if switch(x)=0 for x="Democrats," then $\mathcal{P}_0$ wins if the Democrats win, and loses if the Republicans win. Alternatively, x might be the result of a horse race or the temperature in Topeka, Kansas, or a Supreme Court ruling, or anything else someone out there might want to bet on. As shown in FIG. 2, the outcome is reported by and oracle platform 204 and in accordance with participant agreement 202 defined off-chain by the participants as described in greater detail below.

Financial instruments, and many process flows in general, are essentially bets. As an example, X could be the possible states of an asset, e.g., the price of a particular stock or the location of a physical asset. A binary state machine would then implement a financial instrument known as a "binary option." Some examples of binary options and their associated state machines are shown in Table 1 below.

TABLE 1

| Binary option description | X = | switch(x) |
|---|---|---|
| Tesla, Inc. stock price above $1000 at time T ? | Ticker TSLA price at time T | {0 if x above $1,000 1 if x above $1,000 |
| Flippening at time T ? | (ETH cap, BTC cap) at time T | {0 if BTC cap > ETH cap 1 if ETH cap ≥ BTC cap |
| Peak NYC temp. in 2025 exceeds 120° F.? | Peak NYC temp. in 2025 in F. | {0 if x ≤ 120 1 if x > 120 |
| U.S. women's foil fencing team wins gold in 2024 Olympics? | U.S. women's foil team's medal status in 2024 Olympics (∈ {gold, silver, bronze, no medal)} | {0 if x = gold 1 if x /= gold |

The simple example of a state machine illustrated in FIG. 2 provides confidentiality for the receiver identity and renders private the nature and outcome of the underlying bet. In other words, only the participants (Alice, Bob, and the oracle) learn X and the logic of the state machine. The payments themselves are visible on chain. However, assuming the payments are not readily linkable to Alice and Bob, then the identity of the payee (and loser) of the bet will also remain confidential to observers of the distributed ledger, and even to oracle 204. For simplicity, the disclosed implementations illustrate two-participant state machines with binary values as oracle reports. However, the invention encompasses any number of participants and various types of switch logic. One of skill in the art will readily be able to generalize the implementation based on the disclosure herein.

Privacy of oracle data is also important in view of the potential for "adversarial oracles." Instead of the usual two sets of parties, those internal and those external to a contract, the adversarial model encompasses three types of parties potentially interacting with a smart contract $\mathcal{M}$:

Oracles: The oracle $O$ (or set of oracles $O = \{O_1, \ldots O_m\}$ providing data to $\mathcal{M}$.

Internal participants: The participants participating in the state machine, e.g., the Alice and Bob of our examples above.

External participants: Other on-chain entities in the system.

Disclosed implementations can achieve three key security properties:

Confidentiality: Privacy for the terms, the query, amounts, timing, etc., of $\mathcal{M}$ as much as possible from external participants and $O$.

Auditability: transparency to third parties where appropriate, such as stakeholders and regulatory agencies.

Robustness to oracle faults: An oracle has wide latitude to misbehave, potentially issuing false or delayed reports, colluding with internal and/or external participants, etc. A state machine construction should safeguard as much as possible against these behaviors, even if it cannot guarantee correctness.

The confidentiality of the disclosed implementations has two components: message/payment confidentiality and query confidentiality. Message/Payment confidentiality is privacy for information, such as payment information, recorded on a distributed ledger in two senses:

Destination confidentiality (privacy for the identities of participants to which payments or other messages are routed by a decoupling of pseudonym addresses receiving payouts from input identities of participants.

Content confidentiality: (privacy for the amounts or other information involved in the underlying resulting messages).

Query confidentiality refers to making the state machine and the input switch value private. Ideally, confidentiality can be enforced in a with respect to both external participants and the oracle. Query confidentiality with respect to the oracle is trickier. As the oracle evaluates the switch value, it would seem infeasible to keep query data private from it. However, such confidentiality is in fact possible, using trusted hardware, as taught by US Patent Publication No. 2017-0352027 A1.

An additional form of confidentiality to consider is timing confidentiality. The time at which a query is resolved and thus the time the oracle might trigger a switch serves as a side channel that can reveal information about a switch. This is discussed in greater detail below Query confidentiality has implications beyond privacy. It also provides an additional, subtle security property, namely protection against various forms of oracle "freeloading", i.e. when oracle data is read and used by parasitic contracts| using, e.g., ProvEth or a less expensive oracle query that replays on-chain data. Freeloading presents two problems: (1) reuse of oracle outputs is unfair, in the sense that while one entity pays for queries, others benefit without compensating the oracle and; (2) reuse of oracle outputs creates complex dependencies that are difficult to evaluate and possibly cause oracle failure. Query confidentiality prevents such abuses.

In the disclosed implementations, confidentiality is enforced strongly with respect to external participants and the oracle. However, there are instances in which other stakeholders may require access to the internals of a the state machine, including audits of participating participants, regulation of participants or regulatory oversight of the ecosystem with an eye to systemic risks, and investigations by law enforcement.

Accordingly, the implementations support auditability. A state machine includes an immutable transaction record recorded on the distributed ledger. A third party such as an auditor can therefore verify participant claims about the terms, execution, and payouts of the state machine. One option is to require ciphertexts on chain that can be decrypted by an auditor or regulator or by law enforcement. This is discussed in greater detail below.

A fully trusted oracle would always comply correctly with the terms of service pre-agreed upon with internal participants, which are referred to as "terms" herein. Terms includes a specification of the predicate switch to be evaluated by the oracle (with a specification of X, if there's ambiguity) a deadline to report by which the oracle must deliver a report, i.e., its evaluation of function switch(x), and the delivery target for the report, namely the smart contract. Achieving oracle trustworthiness in practice requires certain assumptions, such as the trustworthiness of trusted execution environments or that a distributed oracle $O = [O_1, \ldots O_m]$ has a majority of honest nodes as described in US Patent Publication No. 2017-0352027 A1. Ideally, however, an oracle-dependent system, should fail gracefully when these assumptions do not hold. It is also useful therefore to consider a model addressing key security requirements even if an oracle misbehaves. Disclosed implementations show how to enforce: 1) accountability (if and oracle not comply with terms, then any internal participant can prove this non-compliance to an auditor (or other stakeholder); 2) collusion-resistance (no coalition, including and oracle and participants or other parties, can defraud a participant except by means of an auditable oracle failure; and 3) denial-of-service resistance (if and oracle fails to provide timely input to the switch, participants can still withdraw their funds.

One implementation is a two-participant, binary-option construction. We assume that Alice, Bob, and the specified oracle $O$ can communicate over secure private channels to agree privately on the terms of the underlying financial instrument or other process in which they are involved. As noted above pseudonyms of the form $\mathcal{P}_i$, each of which has an associated (randomly selected) address on the distributed ledger as a wallet address. For convenience of description, $\mathcal{P}_i$ is used herein to denote the pseudonym or its associated address, depending on the context. Similarly, $\mathcal{P}_i$ is sometimes conflated with the participant that controls the pseudonym, e.g., either Alice or Bob. $\sigma_p [V]$ denotes a cryptographic signature by participant $\mathcal{P}_i$ (or $O$) on a value or set of values $V$. Where clear from context, the subscript is sometimes omitted. The symbol "$" is used to denote a monetary amount(s) but is not necessarily in the currency of USD.

Returning to the example of FIG. 2, participant agreement 202 is a data structure, stored in electronic storage for example, that represents an agreement between the participants and the oracle on the terms of the contract and a timeout that pays out refunds if a fault occurs. In an off-chain setup phase, Alice and Bob generate respective public/private cryptographic key pairs, in accordance with known techniques such as PKI for example. The participants then can derive wallet addresses from the key pairs and randomly assign these addresses to pseudonyms, $\mathcal{P}_0$ or $\mathcal{P}_1$ in this example. For example, Alice and Bob can select a random bit b and Alice assigns an address on the distributed ledger under her control to $\mathcal{P}_b$, and Bob similarly to $\mathcal{P}_{1-b}$. This creates a private association between output addresses and input addresses. The participants also agree on a specification S of the switch function to be used in the state machine and the time at which it is run, an amount $p that each will pay in, and a deadline to report by which the oracle must deliver its report. Finally, the two participants agree with the oracle, still off-chain, on the terms of the oracle's reporting, namely terms=(S; $t_{report}$; $\mathcal{M}$). The oracle transmits signed terms (terms, $\sigma$ o[terms]) to the participants to confirm the participant agreement 202. All of the information above can be recorded in the data structure of the participant agreement 202 in any suitable computer memory device associated with either party or the oracle.

In a subsequent on-chain execution phase performed by the smart contract $\mathcal{M}$, one of the participants sends the public agreed-upon values to the smart contract, namely ($\mathcal{P}_0$, $\mathcal{P}_1$) ($p, $t_{report}$). The participant also sends a cryptographic commitment commit(terms). Cryptographic commitments are well known and are useful for regulatory assurance, as on-chain commitment of terms ensures that it can be presented in a correct and immutable form to a third party.

Each of the participants then pays in $p. to the smart contract by transferring funds to input addresses associated with the smart contract in a known manner. Note that a participant assents to the contract binary option by paying in, only doing so if the participant agrees on the terms and has received signed terms from the oracle. The smart contract then waits for a report from the oracle in accordance with the terms. The oracle sends its report s=switch(x)$\in\{0,1\}$ to the smart contract once it is available.

In the final phase the smart contract makes payments to the participants (or permits withdrawals, depending on the implementation). The oracles delivery of the report transfer the funds to pseudonym/address on the distributed ledger of the "winning" participant, who can immediately withdraw the funds. If no report arrives by timeout $t_{report}$, then the participants payments refunded by transfer of funds on the distributed ledger in a conventional manner. Similarly, any payments are refunded if one participant fails to pay in $p. All three phases of this process are outlined in Table 2 below.

TABLE 2

Setup (off chain):

1:    Alice and Bob agree on S, $t_{report}$, $p, and (randomly ordered) pseudonyms ($P_0$, $P_1$).
2:    Alice (or Bob) sends terms = S, $t_{report}$, $\mathcal{M}$) to $\sigma$.
3:    $\sigma$ sends (terms, $\sigma^\sigma$ [terms]) to Alice and Bob.

Execution (on chain performed by $\mathcal{M}$):

1:    $\mathcal{M}$ receives (($P_0$, $P_1$), ($p, $t_{report}$), commit(terms)) from Alice or Bob.
2:    $\mathcal{M}$ receives $p from Alice and Bob.
3:    $\mathcal{M}$ receives report s = switch(x) from $\sigma$.

Payment (on chain performed by M):

1:    If report s delivered and both players paid in $p to $\mathcal{M}$
2:      $\mathcal{M}$ pays $2p to $P_s$
3:    Else if TIME > $T_{report}$
4:      $\mathcal{M}$ refunds any paid-in funds.

It can be seen that disclosed implementations achieve mix-like payment-destination confidentiality. As a result of off-chain address randomization, neither external parties nor the oracle knows which of Alice and Bob received the funds from the smart contract. However, the payment amounts are on-chain and thus an external observer can determine the payment amounts. This implementation also achieves query confidentiality, i.e. an external observer sees the oracle return nothing but a bit s. Auditability results from the oracle's commitment to the terms. If the oracle provides an incorrect report, i.e., one that is inconsistent with the switch function, then either Alice or Bob can reveal the terms, signed by the oracle, to an auditor, which can then confirm the discrepancy. Collusion-resistance is provided because, if the oracle reports a correct result before the deadline $t_{report}$, a valid payout will occur. Further, the only possible denial-of-service is failure by the oracle deliver a report. The timeout ensures that participants' payouts are refunded in this case.

As noted above, the implementation of FIG. 2 can reveal the pay-in and pay-out amounts. In some cases, this is not desirable as these amounts can leak important information.

It's not just their magnitude that can be sensitive but also their relative sizes. For example, if Alice is paying $2 into a binary option, while Bob is paying only $1, that means Alice is taking the riskier position (2:1 odds). Similarly, if both participants pay in $1, and there is only one payout of $2, it's clear that one participant received all of the money from the option.

By generalizing the pseudonymous payments. This information can be obscured. The phrase "payout slate" is used herein to denote a set of pseudonyms and associated payment amounts. Let the pair ($\mathcal{P}$, $p) denote a payout of $p to pseudonym $\mathcal{P}$. A payout slate can be recognized as a set $\pi=\{(P_i, \$p_i)\}_{i=0}^{n-1}$ payouts over a set of some n accounts. For simplicity, we can assume n is fixed across payout slates. However, n can vary across payout slates. $_\pi$ denotes the value of any payout slate. By using a payout slate and also making dummy payments into the mixing mechanism to pad input amounts, participants have privacy for input amounts.

Figure 3:
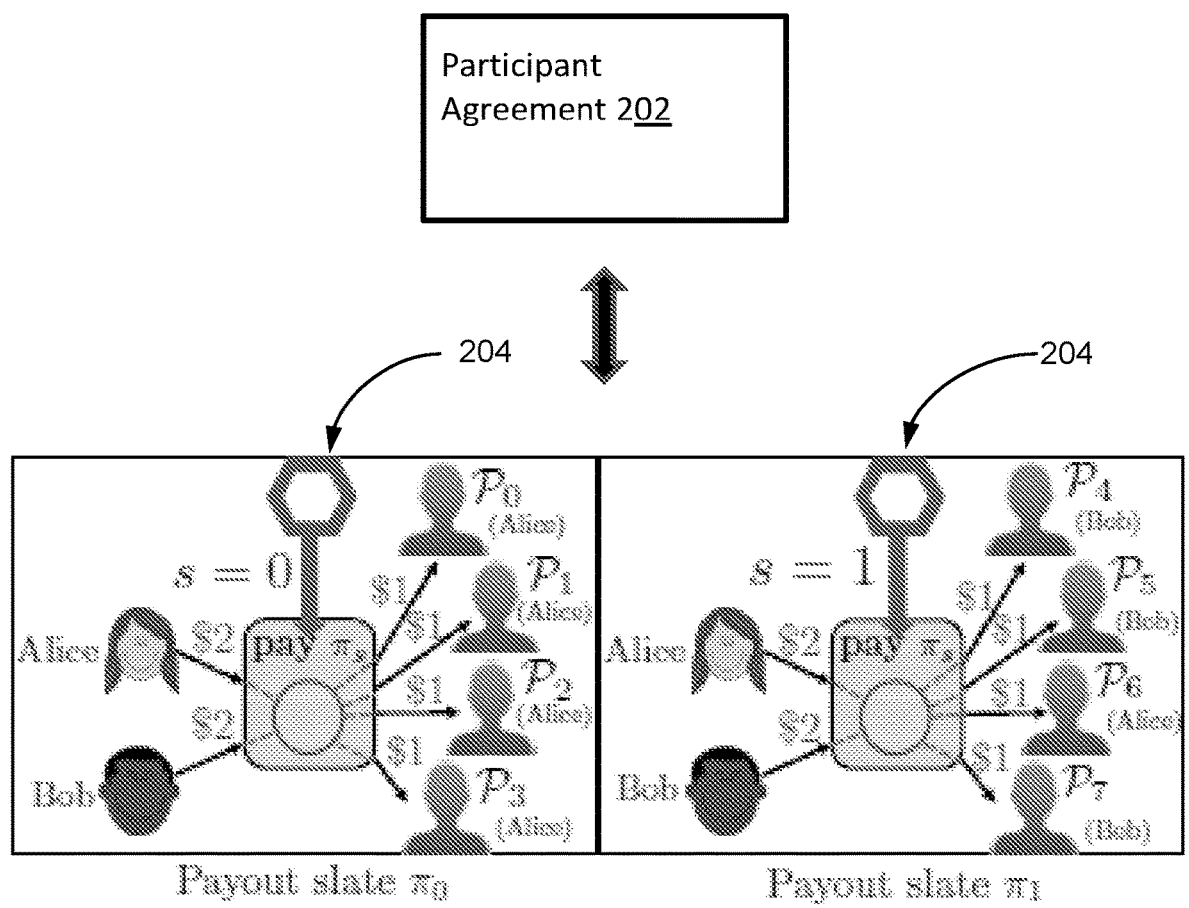
FIG. 3 illustrates the logic of a state machine embodying a payout slate.

FIG. 3 illustrates a state machine in which two payout slates, each with n=4, are applied. The payout slates can be specified as a data structure and included in participant agreement 402. The payout slates are associated with the two possible outcomes, s=switch(x)∈{0,1} where $\pi_0=\{(Pi, \$1)\}_{i=0}^{3}$ and $\pi_1=\{(Pi, \$1)\}_{i=4}^{7}$ In the implementation of FIG. 3, an external participant or oracle sees a financial instrument in which Alice and Bob pay in $2 each, and the payout is in $1 granularity, but nothing more. If s=switch(x)=0, the instrument pays Alice $4; in this case, Alice makes a profit of $2, while Bob loses $2. If s=1, then Bob receives $3; thus Bob makes a profit of $1, while Alice loses $1. To put it another way, the profit/loss profile of the instrument is (Alice, Bob)<(+$2;−$2), (−$1; +$1). Thus, Bob is taking a riskier position than Alice. From the point of view of an external party or the oracle however, other non-trivial, dollar-granularity profit/loss profiles are equally viable/possible. For example, it is equally plausible that Alice is taking the riskier position (Alice, Bob)<(−$2; +$2),(+$1;−$1) or the two participants could be assuming equal risk with symmetric positions, e.g., (Alice, Bob)<(−$2; +$2), (+$2;−$2).

Alice and Bob need merely agree between themselves on a switch and payout slates. Thus, a binary financial instrument can be defined by a switch with specification S, and a pair of payout slates $\vec{\pi}=(\pi_0, \pi_1)$, with $\$\pi_0=\$\pi_1$ On receiving oracle input s=switch(x), the contract Y allows withdrawals against the payout slate $\pi_S$. Table 3 below outlines this process.

TABLE 3

Setup (off chain):

1:     Alice and Bob agree on S, $T_{setup}$, $T_{report}$ and payout slate set $=\vec{\pi}(\pi_0, \pi_1)$
2:     Alice (or Bob) sends terms = (S, $T_{report}$, $\mathcal{M}$) to σ
3:     σ sends (terms, σo[terms]) to Alice and Bob.

Execution (on chain performed by M):

1:     $\mathcal{M}$ receives ( $T_{setup}$, $T_{report}$, $\vec{\pi}$ commit(terms)) from Alice (or Bob).
2:     $\mathcal{M}$ sets payinFailure ← false.
3:     $\mathcal{M}$ receives $^{\$\pi}/2$ from Alice and Bob.
4:     If TIME > $t_{setup}$ and one player has not paid in $^{\$\pi}/2$
5:        $\mathcal{M}$ sets payinFailure ← true; break
6:     $\mathcal{M}$ receives s = switch (x) from σ

Payment (on chain performed by $\mathcal{M}$):

1:     If payinFailure = true
2:        $\mathcal{M}$ refunds paid-in funds.

TABLE 3-continued

3:     If report s delivered
4:        $\mathcal{M}$ pays against payout slate $\pi_s$;
5:     Else if TIME > $t_{report}$
6:        $\mathcal{M}$ refunds paid-in funds.

This protocol includes another small enhancement, an explicit deadline $t_{setup}$ on participants' commitments to funds that is distinct from the timeout $t_{report}$. This is because in practice, it may be desirable for $t_{setup}$ to expire relatively quickly with committed funds being refunded well before time $t_{report}$, should one participant be faulty.

The manner in which a payout slate is constructed determines how much information about payout amounts is potentially leaked to external parties and the oracle. Using a large value of n in payout slates can increase privacy for payout amounts, but results in higher resource requirements and costs, e.g. gas costs in the case of the distributed ledger being the Ethereum blockchain. An efficient payout slate. i.e. a payout slate with a small value of n, that has what is referred to as "perfect payout privacy", i.e., it reveals no information about payouts beyond the aggregate payout amount. The example below is for $1 granularity contracts, but the techniques can be generalized to any granularity as will be apparent to one of skill in the art. Viewed another way, the example payout slate construction achieves confidentiality as strong as the one dollar ($1), one payment" approach exemplified in FIG. 2 and FIG. 3. The construction of this example achieves n≤[$\log_2\$\pi$].

Assume for simplicity that the payout slate is $\$_\pi=\$2^i-1$. Writing the binary representations $\$_\pi=f/11 \ldots 1$ shows that $\$_\pi=\Sigma_{i=0}^{i-1}\$_\pi[i]$ for $\$_\pi[i]=\$2^i$ In other words, the payout slate can be composed of a set $D=\{\$_\pi[i]\}_{i=0}^{i-1}$ of 1 payments, each representing a "1" bit in the binary representation of the payout slate. It follows that a payout slate for any pair of payouts $\$_{P_0}$, $\$_{P_1}$ respectively to $\mathcal{P}_0$ and $\mathcal{P}_1$ such that $\$\pi=\$_{P_0}+\$_{P_1}$ can be constructed using this same set D. Since $\$_{P_0}\leq\$\pi$, it can be written in binary as a string $\$_{P_0}=b_{l-1}b_{l-2}\ldots b_0$ (possibly with leading zeros). Thus, letting $D_0=\{\$\pi[i]\}_{i|b_i=1}\subseteq D$, results in $\$_{P0}=\Sigma_{\$d\in D}\$d$ and $\$_{P1}=\Sigma_{\$d\in D-D_0}\$d$ As a result, we can always construct a payout slate using the set D, and thereby ensure that no information about payouts is leaked to the two participants. It is possible in general, of course, to round participants' joint input amounts to a contract up to $2^l$ for some l and use the construction described above. One of skill in the art will understand that it is also possible to extend this general approach to more than two participants.

The disclosed implementations permit participants to engage in a sequence of financial instrument executions, each execution being referred to as a "round" herein. In a basic example, participants engage in multiple rounds of interaction, i.e., execution of multiple financial instruments in sequence. However, funds are withdrawn only in the last, or terminal, round. Private payouts are enabled in all non-terminal rounds, i.e., intermediate states are private from both external participants and the oracle. Switches with more than two outputs are fully supported, i.e., cases where the number of possible oracle reports, the "switch cardinality", is non-binary. In other words, the implementations allow for switch(x)∈$\mathbb{Z}_q$ for q>1. Since q may vary the switch cardinality q is maintained as private from external parties.

Index j is used to denote a round and $v^{(j)}$ denotes a given value v in round j, for j∈{1,2, . . . }. To make payout slates in non-terminal rounds, participants do not send these slates explicitly to the contract. Instead, they commit off-chain to what is referred to as "a payout slate set" and denoted by $\vec{\pi}^{(j)}$. This is the set of possible payout slates in a given round.

Participants can commit to the payout slate set by individually cryptographically signing each payout slate contained therein. That is, defining $\pi_i^{(j)} \triangleq \pi_i^{(j)}$ as the ith possible slate in round j, participants sign each of $\{\pi_i^{(j)}\}_{i=0}^{n-1}$ (along with their associated round numbers). The payout slate that emerges as valid from a given round j, which is denoted by $\pi^{(j)}$, is determined by the oracle report $s^{(j)}$ for the round. That is, $\pi^{(j)} = \pi_{a(j)}^{(j)}$. Only in the terminal round do participants reveal to the contract the signed payout slate. This payout slate is denoted by $\pi_a^{(j)}$ or $\pi_{term}$. Participants make withdrawals against $\pi_{term}$. Participants can make additional payments into and/or partial withdrawals from (discussed below) the instrument between rounds.

Figure 4:
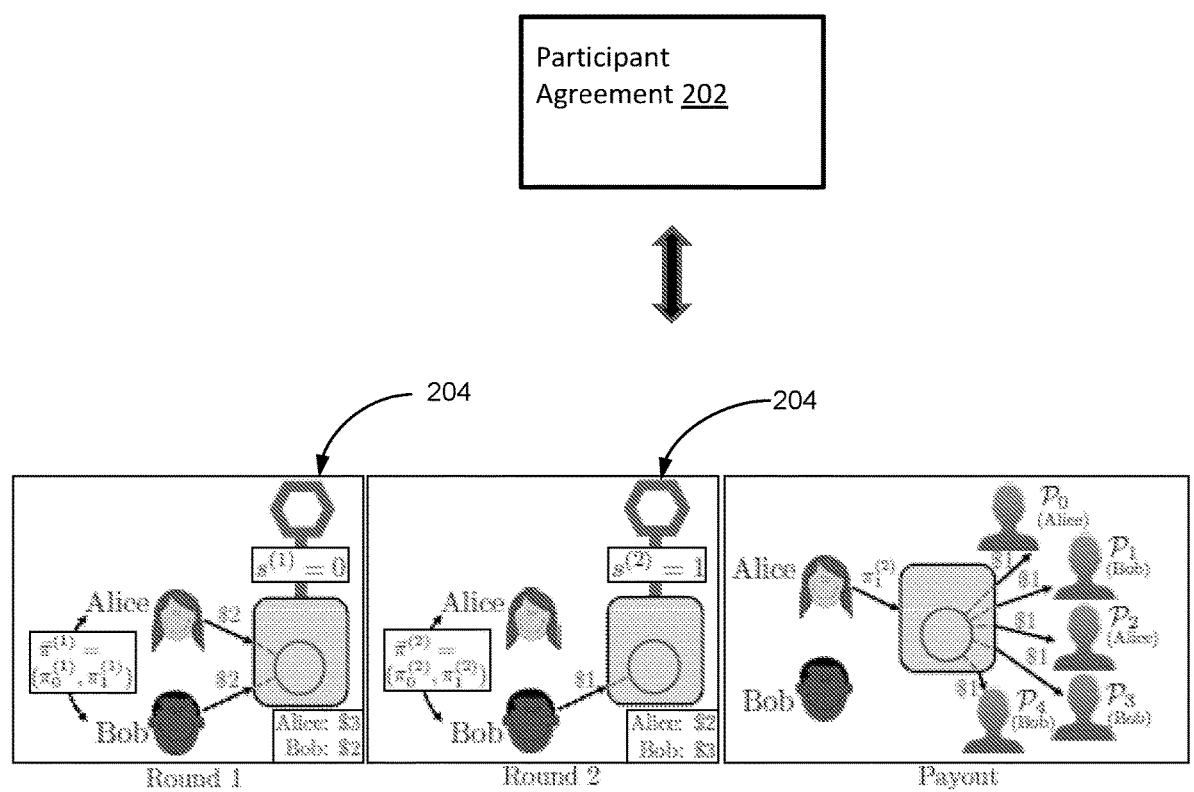
FIG. 4 Illustrates the logic of a state machine embodying multiple rounds of payout slates.

FIG. 4 illustrates an example of multiple payout slates involving binary financial instruments. In this example, Alice and Bob begin by each paying in $2. Off-chain, they execute financial instrument $F^{(1)}$, with payout slate set $\vec{\pi}^{(1)}$, which consists of two payout slates, as the instrument is a binary one. Bob loses $1 in this round, so Alice and Bob end up with respective balances $3 and $1. At the end of the execution in Round 1, no information about balances or payout slates is revealed, i.e., sent to the contract. The process then begins a new round. The participants agree on a new financial instrument $F^{(2)}$, with payout slate set $\vec{\pi}^{(2)}$. This instrument requires that Bob pay in $1. After this instrument is executed in Round 2, Alice loses $1 to Bob, leaving the participants with respective balances $2 and $3. After $F^{(2)}$ is executed, Alice chooses to terminate the process. Alice reveals the terminal payout slate $\pi_{tem} = \pi_1^{(2)}$, the currently valid payout slate. The contract checks that this slate matches the most recent oracle report $s^{(2)}$, and then permits the participants to withdraw their funds.

External parties and the oracle see only the payouts in the last round. They observe neither unexercised payout slates nor the intermediate balances of the two internal participants. The result is privacy for intermediate funds without the use of complex cryptography to secure the data. It will be apparent to one of skill in the art that the concept can be extended to any number of rounds. If a fault occurs at any time one participant can initiate withdrawals against the current payout slate. For example, if Bob or the oracle fails to follow through on the execution of a financial instrument in round j or the setup in round j+1, Alice can terminate the process and make withdrawals against the currently valid payout slate $\pi^{(j)} = \pi_{term}$.

Given the use of signed payout slates, switch cardinality q can be made private with respect to external parties. The report $s^{(j)} \in \mathbb{Z}_q$ can be used as an index into $\vec{\pi}^{(j)}$ and thus provides information about q. If the output of the oracle is modified by replacing $s^{(j)}$ with a random value (bitstring) called a "tag", no information about q is leaked. More specifically, the participants assign to each possible value a corresponding tag $T_i^{(j)}$. This tag can, for example, be a random 128-bit string, i.e., $T_i^{(j)} \leftarrow^s \{0,1\}^{128}$. Tags are used by the oracle in place of indices when sending a report. In other words, instead of sending $s^{(j)} = switch^{(j)}(x^{(j)})$, the oracle sends the tag tag $T_{a(j)}^{(j)}$.

The switch cardinality and contract structure can be maintained private from the oracle by introducing dummy outcomes. Consider a binary option involving Tesla's stock price sp. For example, whether sp is greater than or equal to $1000. The participants can ask the oracle to report the stock price rounded down to the nearest $100. They can create and send to the oracle signed tags associated with each such outcome for sp (e.g. for {$0, $100, . . . , $2000}), but generate and associate with these outcomes only two distinct payout slates for the binary option, $\pi_0$ for sp<$1000 and $\pi_1$ for sp≥$1000. In this way, participants can reveal to the oracle only an upper bound on the true switch cardinality q (e.g., q'=21 and q=2 in this simple example).

Now, with reference to FIG. 5 an implementation will be described that brings together the confidentiality techniques described above, including privacy for non-terminal payout slates and switch cardinality (as well as payout slates with perfect payout privacy). This implementation reveals to external parties only: (1) the amounts paid in by participants, (2) the number of rounds of execution; and (3) the timing of oracle reports and withdrawals. This implementation will be described as a two-participant example but can readily be extended to any number of participants. To simplify notation, the inclusion of the round index and the address of the contract in signed messages and commitments is left implicit.

Figure 5:
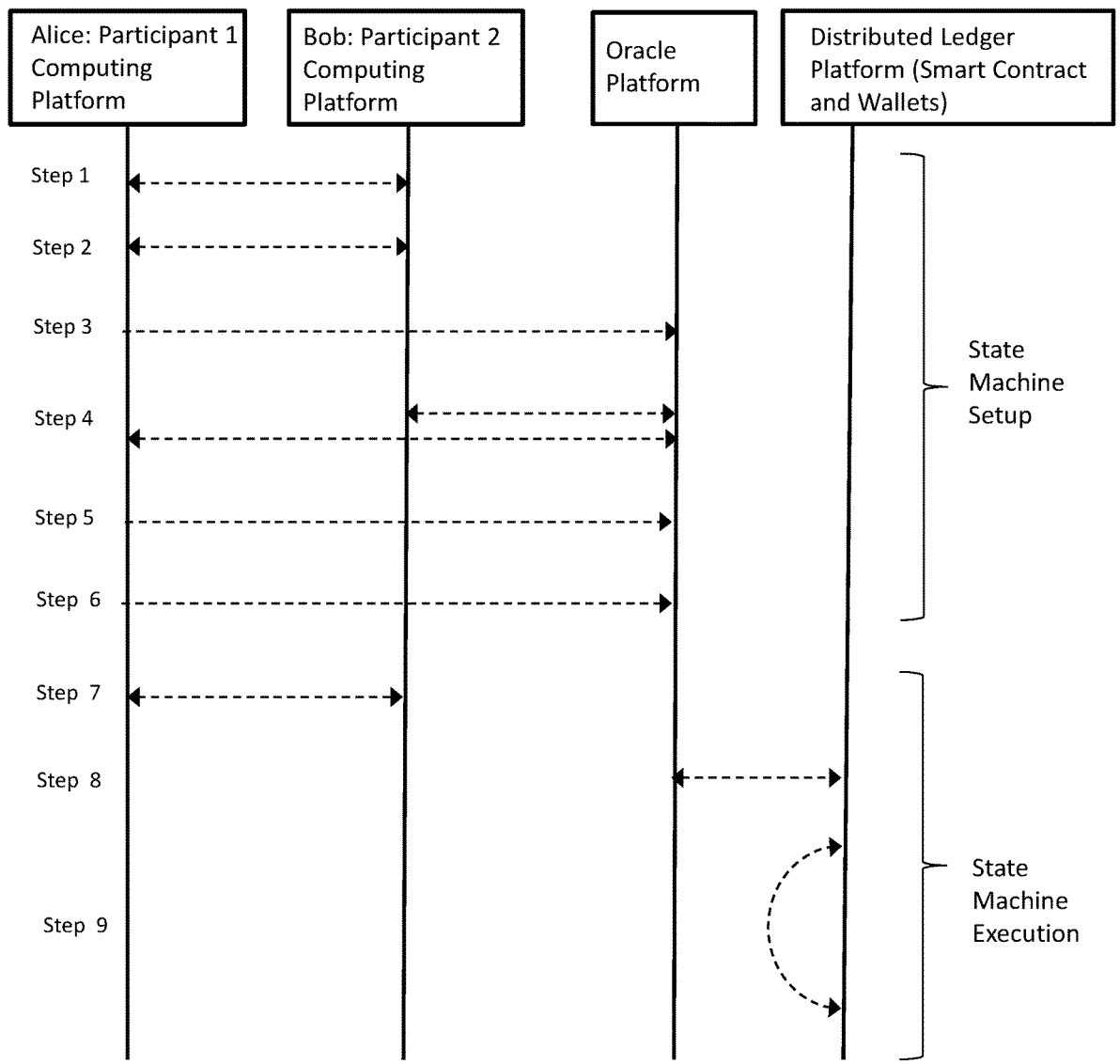
FIG. 5 is a message flow diagram in accordance with disclosed implementations.

In FIG. 5 messaging between various computing platforms in a distributed computing environment is illustrated. Participant 1 computing platform is associated with Alice and participant 2 computing platform is associated with Bob. Each of these platforms can be similar and are described in greater detail below. Distributed ledger platform can be any distributed ledger defined by participant nodes and capable of executing smart contracts, such as Ethereum Hyperledger. Oracle Platform can be a computing platform associated with the relevant oracle(s). The content of each message transmitted between the computing platforms is described below. The messages can be data structures of known formats. Various known communication protocols can be used for communication of the messages.

In each round j, participants select and execute a fresh financial instrument $F^{(j)}$. This instrument consists of:
- a switch specification, denoted by $S^{(j)} = (switch^{(j)}; X^{(j)})$;
- a setup deadline $t_{setup}^{(j)}$ (this deadline prevents issues around (un)fair exchange by forcing the setup to be completed by a certain time);
- an oracle report delivery deadline $t_{report}^{(j)}$;
- a payment slate set with each individual payout including a payee pseudonym/address; and
- an ordered set of random tags associated with the q possible outcomes for the instrument as described above.

Thus $F^{(j)} = (S^{(j)}, t_{setup}^{(j)}, t_{report}^{(j)}, \vec{\pi}^{(j)}, T^{(j)})$. A round proceeds in two phases, state machine setup (which includes configuration and provisioning of the state machine on the distributed computing platform) and round execution (in which the state machine is executed and state changes are recorded on the distributed ledger). A final phase of execution, termination, can be triggered in any given round as described below.

To initiate a round, the participants first a agree upon $F^{(j)}$ off-chain and generate a payout slate set enhanced with the tags from T, denoted by $\vec{\pi}_{+T}^{(j)} = \{(\pi_i^{(j)}, T_i^{(j)})\}_{i=1}^q$ (Step 1 of FIG. C). Additionally, the participants all sign each element of $T^{(j)}$ and $\vec{\pi}_{+T}^{(j)}$ (Step 2 of FIG. C). For simplification, we let $\sigma[T^{(j)}]$ and [T(j)] and $\sigma[\pi_{+T}^{(j)}]$ respectively denote these sets of signatures. The participants then send a proposal proposal$^{(j)}$=($S^{(j)}$, $t_{setup}^{(j)}$, $t_{setup}^{(j)}S\pi^{(j)}$, $T^{(j)}$, $\sigma[T^{(j)}]$) along with signatures $\sigma[$proposal$^{(j)}]$ to the oracle (Step 3 of FIG. C). If the oracle approves of the proposal, the participants and the oracle exchange messages to agree on terms terms$^{(j)}$=($S^{(j)}$, $T^{(j)}$) and a corresponding commitment commit (terms$^{(j)}$) to which all parties know the opening, as well as smart contract parameters params$^{(j)}$= ($t_{setup}^{(j)}$, $t_{report}^{(j)}$, $\$\pi^{(j)}$, commit (terms$^{(j)}$)) with a cryptographic signature by all parties (Step 4 of FIG. C). Acceptance by the oracle can be based on based conditions specified by logic and/or parameters associated with the oracle. For, example, the logic and/or parameters may specify the type of data the oracle can provide and the speed and frequency at which it can provide the data. Having agreed on all details of the round, one of participant sends params$^{(j)}$ and $\sigma[$params$^{(j)}]$ to the contract prior to the expiry of $t_{setup}^{(j)}$ (Step 5 of FIG. C). If the contract isn't fully funded yet (i.e. the balance of the contract is less than $\$\pi^{(j)}$, both participants can pay in the required funds until $t_{setup}^{(j)}$. Round setup is complete once sufficient funds are present (Step 6 of FIG. C). Step 6 concludes the setup and provisioning of the state machine.

As noted above, the state machine executes in rounds (state machine execution). The completion of a round is triggered by delivery of a report from the oracle to the smart contract. This report takes the form of a tag $T^{(j)}=T_{x^{(j)}}^{(j)}$ representing the output of the switch $s^{(j)}$=switch$^{(j)}(x^{(j)})$in $F^{(j)}$. As noted above, use of a tag in lieu of switch output $s^{(j)}$ makes the switch cardinality q private. The oracle also sends the participants' signature $\sigma[T^{(j)}]$ so that the smart contract can confirm the validity of the tag. This prevents a malicious oracle from mounting a denial-of-service attack using an invalid tag.

The participants share and store (off-chain) a pair ($\pi^{(j)}$, $T^{(j)}$) with signature $\sigma[(\pi^{(j)}, T^{(j)})]$ created during the state machine setup described above. This pair creates a binding between the tag $T^{(j)}$ and $\pi^{(j)}$, thus validating $\pi^{(j)}$ as the current state of the state machine (Step 7 of FIG. C). In a non-terminal round, $\pi^{(j)}$ is not revealed to the smart contract, and remains confidential. The state machine then waits until a report to be sent from the oracle to the smart contract on the distributed ledger (Step 8 in FIG. C). In response to the oracle report, the smart contract changes a state of the state machine and records transactions, or other messages, corresponding the relevant addresses/pseudonyms on the distributed ledger as required by the application (Step 9 of FIG. C). Execution through subsequent rounds is handled in a similar manner.

A round j is terminal, i.e. the last round of execution of the state machine, if; (1) either participant calls the payout function of the smart contract while the smart contract is not currently awaiting a report from the oracle; (2) a failure occurs during the setup of round j+1 because the balance of the smart contract does not reach $\$\pi^{(j+1)}$ before $t_{setup}^{(j)}$ expires; or (3) the oracle fails to deliver a report before $t_{report}^{(j+1)}$ expires. More complex rules, e.g., with the smart contract enforcing termination by some predetermined round j=$r_{term}$ are also possible as required by the specific application.

Upon calling the payout function, one participant must send ($\pi^{(j)}$, $T^{(j)}$ along with signatures by both participants generated during setup to the smart contract. The smart contract M verifies that $T^{(j)}$ matches the latest outcome tag reported by the oracle. If so, $\pi^{(j)}=\pi_{term}$ is confirmed as the terminal slate. The smart contract then pays participants against payout slate term by recording transactions, or other messages, corresponding the relevant addresses/pseudonyms on the distributed ledger as required by the application. Table 4 below outlines the protocol of the process described above.

TABLE 4

Setup off chain round J

1: Alice and Bob agree on financial instrument
$F^{(j)} = (S^{(j)}, t_{setup}^{j}, t_{report}^{j}, \vec{\pi}^{(j)}T^{(j)})$
2: Alice and Bob jointly generate $\pi^{(j)}_{+t}$, $\sigma[\pi^{(j)}_{+t}$ and $\sigma[T^{(j)}]$
3: Alice and Bob prepare proposal$^{(j)}$ =
$(S^{(j)}, t^{(j)}_{setup}, t^{(j)}_{setup} S\pi^{(j)}T^{(j)}, \sigma[T^{(j)}])$
4: Alice and Bob send proposal$^{(j)}$ with signature $\sigma[$proposal$^{(j)}]$to $\sigma$.
5: Alice, Bob, and $\sigma$ agree on params$^{(j)}$:=
$(t^{(j)}_{setup}, t^{(j)}_{report}, \$\pi^{(j)}$, commit (terms$^{(j)}$))
6: Alice, Bob, and $\sigma$ jointly generate signatures $\sigma[$params$^{(j)}]$
Execution (On chain Round j):

1: Alice sends params$^{(j)}$ and $\sigma[$params$^{(j)}$ to $\mathcal{M}$.
2: Alice and/or Bob (optionally) pays into $\mathcal{M}$
(in round 1 or if $\$\pi^{(j-1)} < \$\pi^{(j)}$)
3: $\sigma$ finds $s^{(j)}=$ = switch$^{(j)}(x^{(j)})$and sends $T^{(j)x}_{(x)}$ with $\sigma[T^{(j)x}_{(x)}]$to $\mathcal{M}$
Termination (Round j):

1: Alice sends a decommitment of $\pi_{term}$ =
$\vec{\pi}^{(j)}_{(j)}$ with $\sigma[\vec{\pi}^{(j)x}_{(j)}, T^{(j)x}_{(x)}]$ to $\mathcal{M}$
2: $\mathcal{M}$ makes (pseudonymous) payouts against payout slate $\pi_{term}$.

Figure 6:
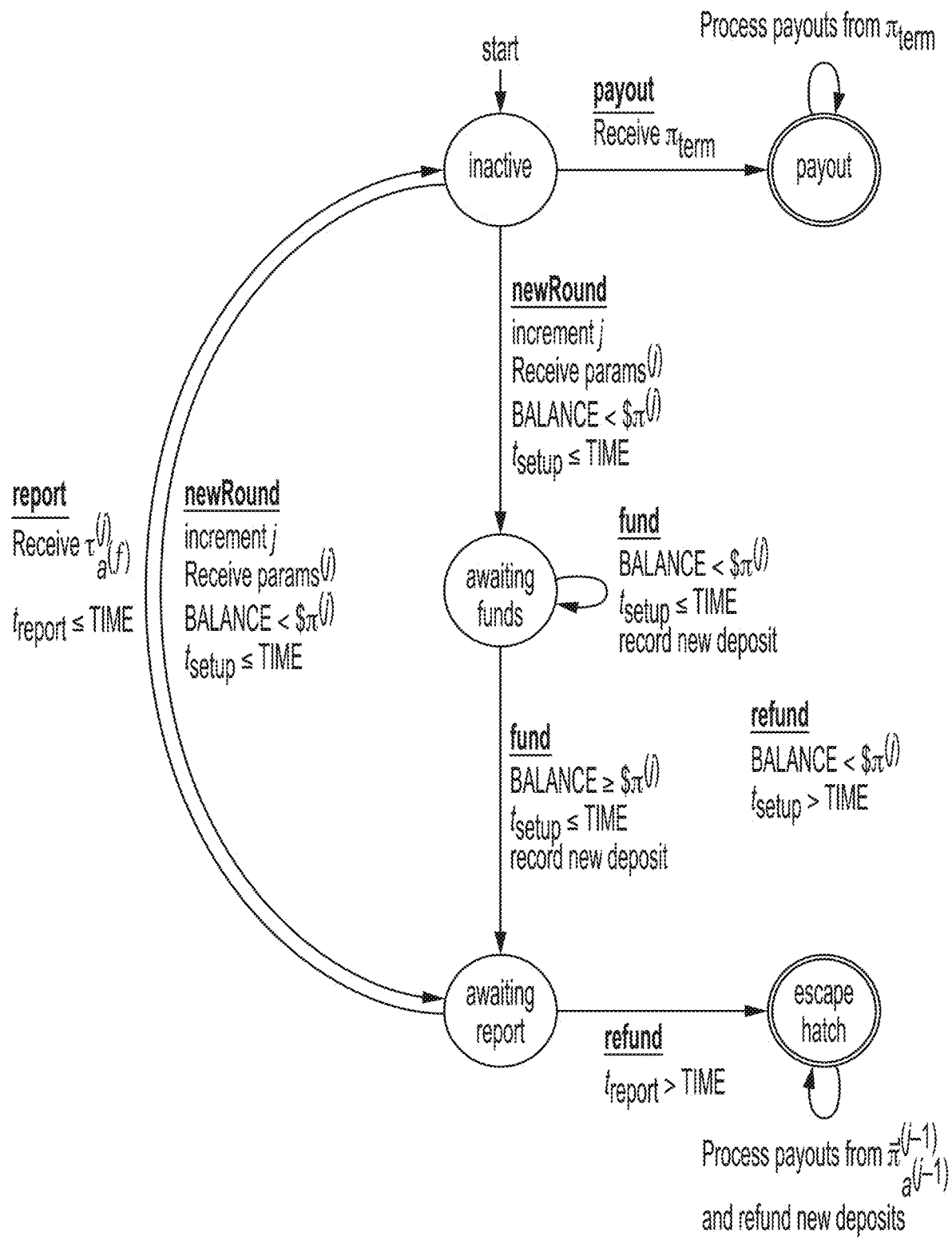
FIG. 6 is a simplified diagram of the secure state machine in accordance with a disclosed implementation.

FIG. 6 is a simplified diagram of the secure state machine in accordance with a disclosed implementation. Function calls act as state transitions. Signature details and caller identity checks are omitted from FIG. 6 for simplicity. However, other conditions that must be satisfied for a state transition are indicated in correspondence to the description above. TIME and BALANCE represent the current time and the contract's balance respectively.

Figure 7:
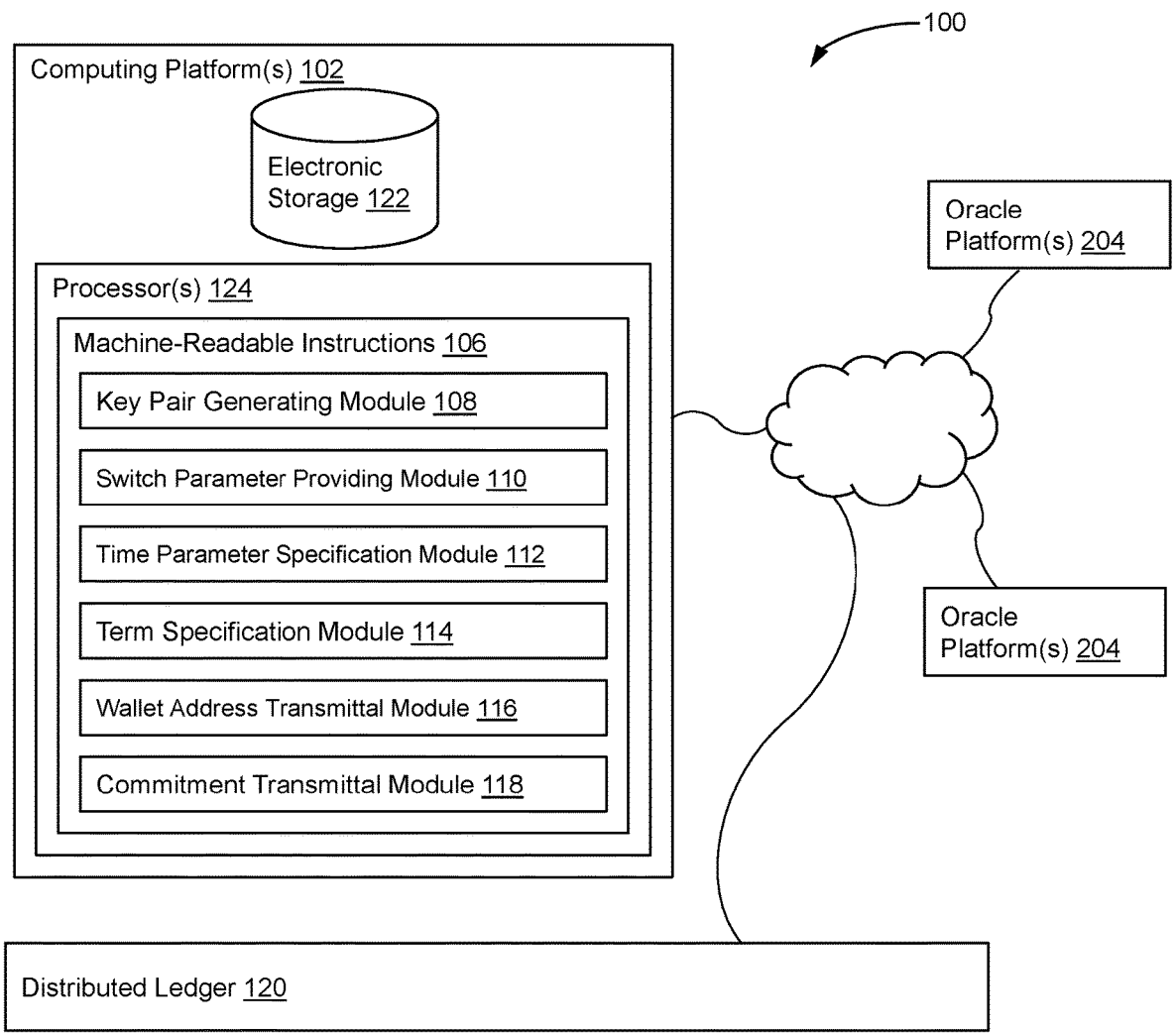
FIG. 7 illustrates a system configured for implementing a secure state machine implemented as computer logic in a networked computing environment, in accordance with one or more implementations.

FIG. 7 illustrates a system 100 configured for implementing a secure state machine implemented as computer logic in a networked computing environment, in accordance with one or more implementations. For example, system 100 can accomplish any of the implementations disclosed above. In some implementations, system 100 may include one or more computing platform(s) 102. Computing platform(s) 102 may be configured to communicate with one or more oracle platforms 204 according to a client/server architecture and/ or other architectures. Oracle platform(s) 204 may include one or more oracles and may be configured to communicate with other computing platforms via according to a peer-to-peer architecture, a client server architecture and/or other architectures. Users may access system 100 via nodes of distributed ledger 120 or through other networked user computing devices. Distributed ledger 120 can be defined by multiple user nodes. Each node may include computer hardware and node software. Note that computing platform(s) 102 may be implemented in whole or in part by one or more user devices and the user nodes may be comprised of one or more user devices. The devices corresponding to the user nodes can be the same devices that implement computing platform(s) 102. These elements are segregated by function in FIG. A but can be implemented by overlapping sets of computing devices.

Computing platform(s) 102 may be associated with a participant and may be configured by machine-readable instructions 106. Machine-readable instructions 106 may define one or more instruction modules. The instruction modules may include computer program modules. The instruction modules may include one or more of key pair generating module 108, switch parameter providing module 110, time parameter specification module 112, term specification module 114, wallet address transmittal module 116, commitment transmittal module 118, and/or other instruction modules.

Key pair generating module 108 may be configured to generate a public key/private key pair for each of multiple participants respectively. Each public key/private key pair may be associated with a pseudonymous wallet address in the distributed ledger environment. Switch parameter providing module 110 may be configured to provide a switch parameter for the state machine. The switch parameter may assume one of plural values. Time parameter specification module 112 may be configured to specify time parameters for reporting, by an offchain oracle, the value of the switch parameter.

Term specification module 114 may be configured to specify terms for reporting, by one or more oracle platform(s) 204, the value of the switch parameter to executable logic recorded on the distributed ledger. The oracle platform(s) 204, may transmit the value of the switch parameter in accordance with the time parameters and the terms. The terms may include identification of a time limit on reporting the switch logic and an address of corresponding executable logic, such as a smart contract, stored on the distributed ledger. Therefore, the executable logic and the switch are coupled by virtue of the corresponding oracle platform(s) 204. Commitment transmittal module 118 may be configured to, at least one of the participants, transmit at a cryptographic commitment of a value amount to a wallet address on the distributed ledger corresponding to the executable logic. The executable logic may record a message on the distributed ledger corresponding to at least one of the wallet addresses based on the switch value as reported by the offchain oracle in accordance with the time parameters and the terms.

Computing platform(s) 102, oracle platform(s) 204, and/or distributed ledger 120 may be operatively linked via one or more electronic communication links to define a networked computing environment. For example, such electronic communication links may be established, at least in part, via a network such as the Internet and/or other networks. It will be appreciated that this is not intended to be limiting, and that the scope of this disclosure includes implementations in which computing platform(s) 102, oracle platform(s) 204, and/or distributed ledger 120 may be operatively linked via some other communication media. This arrangement creates a secure state machine that may be used to accomplish various functions in the manner set forth in detail below.

Computing platform(s) 102 may include electronic storage 122, one or more processors 124, and/or other components. Computing platform(s) 102 may include communication lines, or ports to enable the exchange of information with a network and/or other computing platforms. Illustration of computing platform(s) 102 in FIG. A is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 122 may store the off-chain data described above, such as the participant agreement 202, and may comprise non-transitory storage media that electronically stores information. The electronic storage media of electronic storage 122 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from computing platform(s) 102, information received from oracle platform(s) 204, and/or other information that enables computing platform(s) 102 to function as described herein.

Processor(s) 124 may be configured to provide information processing capabilities in computing platform(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. A as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 114, 116, and/or 118, and/or other modules. Processor(s) 124 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118 are illustrated in FIG. A as being implemented within a single processing unit, in implementations in which processor(s) 124 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 124 may be configured to execute one or more additional modules that may perform some or all of the functionality attributed below to one of modules 108, 110, 112, 114, 116, and/or 118.

Figure 8:
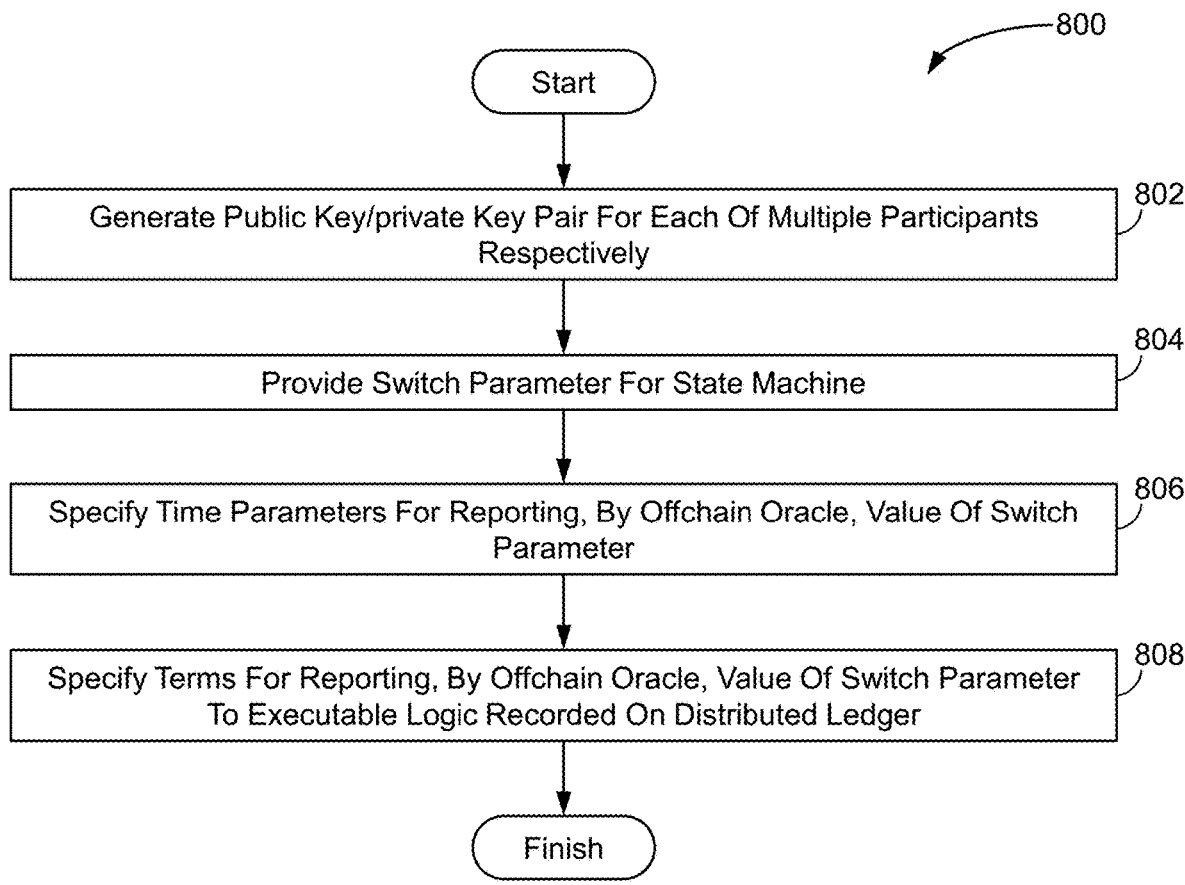
FIG. 8 illustrates a method for implementing a secure state machine implemented as computer logic in a networked computing environment, in accordance with one or more implementations.

FIG. 8 illustrates a method 800 for implementing a secure state machine implemented as computer logic in a networked computing environment, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. B and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 200. For example, the method 200 can be accomplished by system 100 of FIG. 7.

An operation 802 may include generating a public key/private key pair for each of multiple participants respectively. Each public key/private key pair may be associated with a pseudonymous wallet address in the distributed ledger environment. Operation 802 may be performed by one or more hardware processors configured by machine-readable instructions including a module that is the same as or similar to key pair generating module 108, in accordance with one or more implementations.

An operation 804 may include providing a switch parameter for the state machine. The switch parameter may assume one of plural values. Operation 804 may be performed by one or more hardware processors configured by machine-readable instructions including a module that is the same as or similar to switch parameter providing module 810, in accordance with one or more implementations. An operation 806 may include specifying time parameters for reporting, by an offchain oracle, the value of the switch parameter. Operation 806 may be performed by one or more hardware processors configured by machine-readable instructions including a module that is the same as or similar to time parameter specification module 812, in accordance with one or more implementations.

An operation 808 may include specifying terms for reporting, by the offchain oracle, the value of the switch parameter to executable logic recorded on the distributed ledger. The terms may include identification of a time limit on reporting the switch logic and an address of executable logic stored on the distributed ledger. Whereby the executable logic may record a message on the distributed ledger corresponding to at least one of the wallet addresses based on the switch value as reported by the offchain oracle in accordance with the time parameters and the terms. Operation 808 may be performed by one or more hardware processors configured by machine-readable instructions including a module that is the same as or similar to term specification module 114, in accordance with one or more implementations.

The disclosed implementations leverage the concept of "mixing". Mixing is known approach to privacy in computing systems. A "mixer" or "tumbler" is a basic privacy-enhancing tool used today in a number of cryptocurrencies. The goal of a mixer is to improve transaction-layer privacy in systems where payment records are visible on-chain. A mixer takes payments from one set of users as input, and makes payments to another (possibly overlapping) set of users as an output. A mixer makes private the correspondence between inputs and outputs. In other words, as the outside observer of a mixer, you can't tell who's paid whom.

The disclosed implementations also commit data on-chain in a way that facilitates trustworthy reporting of the behavior of a state machine executed by a smart contract to a third party T, such as an auditor, regulator, or other stakeholder. The Commitment to terms enables presentation of a correct, immutable record of the oracle input to the state machine. Either participants or the oracle can decommit terms. By (optionally) including $\vec{\pi}$ in terms the presentation of the instrument's payout options is similarly possible. Participants can prove ownership of the pseudonyms associated with each payout slate using their private keys (e.g., signing challenges from the smart contract). Together, the smart contract and the identities of pseudonym owners define the state machine behavior.

Such information can also be revealed selectively. in other words, a participant can decommit only what they want to report to the stakeholder. Alternatively, it the third party is concerned about participants being unavailable, terms can be placed on chain encrypted under the public key of the stakeholder, as can a joint record of ownership of pseudonyms. This way, even if participants go offline, the state machine remains completely transparent to the stakeholder. One benefit of such encryption is that it can provide conditional anonymity revocation for law enforcement, a well-known notion proposed in connection with pre-Bitcoin anonymous cash. The idea is that a law enforcement entity can request permission to access data, e.g., through a warrant granting permission to decrypt the ciphertext. Additionally, the stakeholder can be distributed. Specifically, the stakeholder private key can be shared out among a set of committee members constituting the stakeholder such that any one of the members can perform threshold decryption. For example, the key might be distributed among three law enforcement agencies such that any two can decrypt the state machine data, but no one such agency can in by itself decrypt the data. Mechanisms for such decryption are well known. Of course, there are many other possible approaches to stakeholder oversight. For example, the oracle could require signoff from a stakeholder (such as a regulator to enforce AML/KYC compliance for participants before providing a report.

The implementations described above can be modified in many ways. some examples are set forth below. Participants may commit to payout slates using Merkle trees, instead of signatures. In every round, they compute a Merkle tree of depth 1 for $2^l > q$ whose leaves contain committed pairs $\{(\pi_0^{(j)}, T_0^{(j)}), (\pi_1^{(j)}, T_1^{(j)}), \ldots (\pi_{q-1}^{(j)}, T_{q-1}^{(j)})\}$ in randomly assigned positions. Let $\mathcal{R}^{(j)}$ denote the Merkle root of this tree. To decommit a payout slate, a participant reveals its corresponding leaf and decommitment, along with a path to $\mathcal{R}^{(j)}$ in the usual manner). External participants then learn only that $K \leq 2^l$ but do not learn q itself.

Implementations can support partial withdrawals in non-terminal rounds. To preserve confidentiality on unwithdrawn funds, the implementation could use fine-grained, authenticated disclosure of payouts, e.g., through signing at the granularity of individual payouts. Provided that participants sign every payout in $\{\pi[k]\}_{k=1}^n$ for every payout slate, individual payouts can be disclosed on-chain without revealing the remainder of the payout slate.

Another possible implementation is as a state channel. Such a variant can be implemented within a generalized state-channel framework. The state machine can intercommunicate with parties and with an on-chain smart contract, and the framework can instantiate the oracle as one of the parties.

The implementations above have focused on binary contracts, such as binary financial options contracts with fixed settlement times. However, implementations can be applied to more complex instruments such as instruments with "marking to market", a phrase denoting daily settlement of changes in asset value. Each such daily settlement may be treated as a round. Participants can pay into the instrument or withdraw on a round-by-round basis, as required. Defaults can be handled, for example, by restricting instrument functionality in various ways to avoid counterparty risk. For example, funds potentially paid in for marketing to market might be capped by the instrument and then prepaid by a participant and held in escrow by the state machine.

A "stop order" is a trading order that executes when an asset reaches a target price. It is straightforward in the framework of the implementations to support instruments containing stop orders or other event-triggered logic. The oracle is simply required to send a report when the stop condition is met.

During setup phase discussed above, participants conduct processing which can become substantial for large outcome spaces. For example, a European call option on one share of a stock STOCK (currently trading at $1179:21) with a strike price of $1500 and a premium of $700. To prudently account for large price swings, the participants would want to cover every price at maturity up to, e.g., $10,000. At a tick size of $0:01 typical for NASDAQ, the participants would have to generate and sign close to a million payout slates (1 for \price at maturity is below $1500:00" and 850,000 to cover every price between $1500:00 and $10,000:00) a cumbersome amount of computation.

Fortunately, the payout function of the disclosed implementations, as well as those of most commonly used real-world derivatives are piecewise linear functions of the price of the underlying asset. Therefore, we can reduce the amount of off-chain computation by the participants by pushing a little more work on-chain. Assume a situation where the oracle reports switch values s rather than randomly chosen tags and that the switch reveals x. Instead of having switch return a single s, it can return a tuple $(s_1; s_2)$ that is a base-c representation of the price of the underlying asset x, where c is a constant base chosen by the participants during setup (with the goal of minimizing the amount of computation the participants have to perform). The first element is computed as $s_1:=[x/c]$ the second element is computed as $S_2:=X$ mod c, and hence $x=S_1 C+S_2$. For a linear piece of our payout function $f(x)=ax+b$, we thus have $f(x)=as_1c+(as_2+b)$, and we can have the participants sign two independent payout slates for all possible values of $s_1$ and $s_2$. The oracle will report both $s_1$ and $s_2$ to the smart contract, and during the payout phase the participants will submit separate slates for $s_1$ and $s_2$ corresponding to the payouts for $as_1c$ and $as_2+b$. In the case of the call option example above, the participants might choose a value of c=10:00, leading to $S_1 \in \{0, 150, 151, \ldots 999\}]$ and $S_2$ E $\{0.00, 0.01, \ldots 9.99\}$. They would thus have to sign only 1851 slates (851 slates for 851 possible values of $s_1$ and 1000 slates for 1000 possible values of s2, greatly reducing the amount of computation during setup of the instrument.

One of skill in the art will readily see that the implementations can easily be extended to a set of n≥2 participants $P_0, \ldots P_{n-1}$ that are content with internal transparency, i.e., don't require confidentiality. In this case, all participants could sign the instrument and payout slates to achieve security. In turn, the participation of more participants results in stronger confidentiality against outsiders, since the active parties in any given arrangement enjoy privacy within a larger anonymity set.

As noted above, the implementations can be used in various applications, the tacking of physical assets in a supply chain for example. The smart contract is agnostic to the implementation detail of what asset is being transferred by it. If the asset offers balance-like functionality for checking ownership and transfer-like functionality for changing ownership, the implementations can be easily applied to such applications. A state machine of the implementations could also support multiple asset types simultaneously. In particular, extending implementations to support ERC-20 tokens and various derived token types such as ERC-777 and ERC-1155 tokens will be straightforward to one of skill in the art. Even non-fungible tokens (NFTs) could be easily supported and useful, enabling a conditional sale of an NFT for currency with guaranteed delivery as an example.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for implementing a secure state machine implemented as computer logic in a networked computing environment, the system comprising: one or more hardware processors configured by machine-readable instructions to: generate a public key/private key pair for each of multiple participants respectively, each public key/private key pair being associated with a pseudonymous wallet address in the distributed ledger environment, wherein the networked computing environment including a distributed ledger defined by multiple nodes, each node including computer hardware and node software; provide a switch parameter for the state machine, the switch parameter assuming one of plural values; confidentially share, between the participants and an offchain oracle, a mapping binding between an event outcome and the switch parameter value; and specify terms for reporting, by the offchain oracle, the value of the switch parameter to executable logic recorded on the distributed ledger, the terms including an address of executable logic stored on the distributed ledger, whereby the offchain oracle reports the switch parameter value to the executable logic in response to the event and the executable logic records a message on the distributed ledger corresponding to at least one of the wallet addresses based on the switch value as reported by the offchain oracle in accordance with a time parameter and the terms.

2. The system of claim 1, wherein each participant generates at least one pseudonymous wallet address corresponding to a public key/privacy key pair, said address for use by the participant in interaction with said executable logic.

3. The system of claim 2, wherein the secure state machine is used to accomplish a financial transaction and the message recorded on the distributed ledger transfers ownership of value to at least one of the pseudonymous wallet addresses.

4. The system of claim 3, wherein the message comprises a payout slate of multiple messages indicating multiple payouts to at least one of the participants.

5. The system of claim 3, wherein there are plural rounds of payout slates.

6. The system of claim 5, wherein the one or more hardware processors are further configured by machine-readable instructions to: allow at least one of the participants to transmit the pseudonymous wallet addresses, the time parameters, the terms, and value amounts to the executable logic; allow at least one of the participants to transmit at a cryptographic commitment of a value amount to a wallet address on the distributed ledger corresponding to the executable logic; receive, from the oracle, the value of the switch parameter in accordance with the time parameters and the terms; and allow the executable logic to record the message on the distributed ledger, corresponding to at least one of the wallet addresses based on the switch value.

7. A method of implementing a secure state machine implemented as computer logic in a networked computing environment, the method comprising: generating a public key/private key pair for each of multiple participants respectively, each public key/private key pair being associated with a pseudonymous wallet address in the distributed ledger environment, wherein the networked computing environment including a distributed ledger defined by multiple nodes, each node including computer hardware and node software; providing a switch parameter for the state machine, the switch parameter assuming one of plural values; confidentially sharing, between the participants and an offchain oracle, a mapping binding between an event outcome and the switch parameter value; and specifying terms for reporting, by the offchain oracle, the value of the switch parameter to executable logic recorded on the distributed ledger, the terms including an address of executable logic stored on the distributed ledger, whereby the offchain oracle reports the switch parameter value to the executable logic in response to the event and the executable logic records a message on the distributed ledger corresponding to at least one of the wallet addresses based on the switch value as reported by the offchain oracle in accordance with a time parameter and the terms.

8. The method of claim 7, wherein each participant generates at least one pseudonymous wallet address corresponding to a public key/privacy key pair, said address for use by the participant in interaction with said executable logic.

9. The method of claim 8, wherein the secure state machine is used to accomplish a financial transaction and the message recorded on the distributed ledger transfers ownership of value to at least one of the pseudonymous wallet addresses.

10. The method of claim 9, wherein the message comprises a payout slate of multiple messages indicating multiple payouts to at least one of the participants.

11. The method of claim 9, wherein there are plural rounds of payout slates.

12. The method of claim 7, further comprising: at least one of the participants, transmitting the pseudonymous wallet addresses, the time parameters, the terms, and value amounts to the executable logic; at least one of the participants, transmitting at a cryptographic commitment of a value amount to a wallet address on the distributed ledger corresponding to the executable logic; receiving, from the oracle, the value of the switch parameter in accordance with the time parameters and the terms; and the executable logic records the message on the distributed ledger, corresponding to at least one of the wallet addresses based on the switch value.

13. A non-transient computer-readable storage medium having instructions embodied thereon, the instructions being executable by one or more processors to perform a method for implementing a secure state machine implemented as computer logic in a networked computing environment, the method comprising: generating a public key/private key pair for each of multiple participants respectively, each public key/private key pair being associated with a pseudonymous wallet address in the distributed ledger environment, wherein the networked computing environment including a distributed ledger defined by multiple nodes, each node including computer hardware and node software; providing a switch parameter for the state machine, the switch parameter assuming one of plural values; confidentiality sharing, between the participants and an offchain oracle, a mapping binding between an event outcome and the switch parameter value; and specifying terms for reporting, by the offchain oracle, the value of the switch parameter to executable logic recorded on the distributed ledger, the terms including an address of executable logic stored on the distributed ledger, whereby the offchain oracle reports the switch parameter value to the executable logic in response to the event and the executable logic records a message on the distributed ledger corresponding to at least one of the wallet addresses based on the switch value as reported by the offchain oracle in accordance with a time parameter and the terms.

14. The computer-readable storage medium of claim 13, wherein each participant generates at least one pseudonymous wallet address corresponding to a public key/privacy key pair, said address for use by the participant in interaction with said executable logic.

15. The computer-readable storage medium of claim 13, wherein the secure state machine is used to accomplish a financial transaction and the message recorded on the distributed ledger transfers ownership of value to at least one of the pseudonymous wallet addresses.

16. The computer-readable storage medium of claim 15, wherein the message comprises a payout slate of multiple messages indicating multiple payouts to at least one of the participants.

17. The computer-readable storage medium of claim 15, wherein there are plural rounds of payout slates.

18. The computer-readable storage medium of claim 14, wherein the method further comprises: at least one of the participants, transmitting the pseudonymous wallet addresses, the time parameters, the terms, and value amounts to the executable logic; at least one of the participants, transmitting at a cryptographic commitment of a value amount to a wallet address on the distributed ledger corresponding to the executable logic; receiving from the oracle, the value of the switch parameter in accordance with the time parameters and the terms; and the executable logic records the message on the distributed ledger, corresponding to at least one of the wallet addresses based on the switch value.

19. The system of claim 1 further comprising specifying time parameters for reporting, by the offchain oracle, the value of the switch parameter and identification of a time limit on reporting the switch logic.

20. The method of claim 7 further comprising specifying time parameters for reporting, by the offchain oracle, the value of the switch parameter and identification of a time limit on reporting the switch logic.

21. The storage medium of claim 13 wherein the method further comprises specifying time parameters for reporting, by the offchain oracle, the value of the switch parameter and identification of a time limit on reporting the switch logic.

* * * * *